United States Patent [19]

Inoue et al.

[11] Patent Number: 5,399,538

[45] Date of Patent: Mar. 21, 1995

[54] POROUS SEPIOLITE, PROCESS FOR PRODUCING SAME AND ADSORPTIVE DECOMPOSITION CATALYST COMPOSTION UTILIZING SUCH POROUS SEPIOLITE

[75] Inventors: Norio Inoue, Kanagawa; Eiki Iida, Tokyo; Makoto Sakura, Kanagawa; Hideyuki Yunoki, Kanagawa; Koji Hara, Kanagawa; Yoshiki Nakano, Kanagawa; Takashi Aihara, Kanagawa, all of Japan

[73] Assignee: Nikki-Universal Co., Ltd., Tokyo, Japan

[21] Appl. No.: 154,541

[22] Filed: Nov. 19, 1993

Related U.S. Application Data

[62] Division of Ser. No. 722,192, Jun. 27, 1991, Pat. No. 5,302,558.

[30] Foreign Application Priority Data

Jun. 27, 1990 [JP] Japan ................................. 2-169330
Aug. 3, 1990 [JP] Japan ................................. 2-206481

[51] Int. Cl.$^6$ ......................... B01J 21/16; B01J 20/12
[52] U.S. Cl. ......................................... 502/84; 502/81
[58] Field of Search ................................. 502/81, 84

[56] References Cited

U.S. PATENT DOCUMENTS 2,430,249 11/1947 Ruthruff ............................... 502/84

FOREIGN PATENT DOCUMENTS

| | | | |
|---|---|---|---|
| 0092991 | 7/1981 | Japan | 502/84 |
| 3059352 | 3/1988 | Japan | 502/84 |
| 2277546 | 11/1990 | Japan | 502/84 |
| 4016236 | 1/1992 | Japan | 502/84 |
| 1563593 | 12/1976 | United Kingdom . | |
| 2160787 | 6/1984 | United Kingdom . | |

OTHER PUBLICATIONS

Muronaka et al., "Hydrogenation of Pitch-Like Material", (Feb. 23, 1983), JP 57-198,788 (Japanese Patent Abstract).

Ono et al., "Catalyst Composition for Hydrogenating Heavyhydrocarbonic Oil", (Feb. 26, 1986), Japan JP 60-193,540 [Japanese Patent Abstract].

Fujitani et al., "Catalyst for Synthesizing Hydrocarbon", (Oct. 3, 1986), Japan JP 61-111,140 [Japanese Patent Abstract].

Umezawa et al., "Special Porous Composite", (Aug. 24, 1988), Japan JP 63-80846 (Japanese Patent Abstract).

Shiba et al., "Bituminous Vibration Damping Material which is applied by Coating for Automobile", JP 03-277674 (Japanese Patent Abstract).

2 English language abstracts of JP 2277546.
2 English language abstracts of JP 56092991.

*Primary Examiner*—Carl F. Dees
*Attorney, Agent, or Firm*—Fish & Richardson

[57] ABSTRACT

Disclosed is a porous sepiolite having an improved water-resistance and thermal shock resistance obtained by grinding, moisture-conditioning and molding sepiolite, and then calcining said molded sepiolite at a temperature in the range of about 650° C. to about 800° C. Also disclosed is a porous sepiolite having a large specific surface area, wherein the pores having a pore diameter of 50 angstroms or less have a specific surface area in the range of from 40 to 200 m$^2$/g and in which no less than 20% of the total surface of the sepiolite is occupied with the pores having a pore diameter of 50 angstroms or less and wherein the pore distribution curve of the sepiolite has a main peak at a pore diameter of no more than 50 angstroms. This sepiolite is obtained by grinding, moisture-conditioning and molding sepiolite, calcining the same at a temperature in the range of about 650° to about 800° C., and then subjecting said calcined sepiolite to an acid treatment.

2 Claims, 4 Drawing Sheets

POROUS SEPIOLITE, PROCESS FOR PRODUCING SAME AND ADSORPTIVE DECOMPOSITION CATALYST COMPOSTION UTILIZING SUCH POROUS SEPIOLITE

This application is a divisional application of U.S. application Ser. No. 07/722,192, filed Jun. 27, 1991, now U.S. Pat. No. 5,302,558.

BACKGROUND OF THE INVENTION

1. Field of the Invention

The present invention relates to a porous sepiolite and a process for producing the same. The invention specifically is concerned with a porous sepiolite which has an improved resistance to water, an improved resistance to thermal shock and a large specific surface area, and with a process for producing the same. This invention also relates to a catalyst composition for deodorization in which a catalyst component is supported on such a porous sepiolite.

2. Description of the Prior Art

Sepiolite is a clay which has tunnels therein along its fibers. Sepiolite is a unique mineral in that it is very soft and has a large adsorption capacity like zeolite. Sepiolite keeps suspension in water like bentonite and has properties of thixotropy and plasticity. In addition, it can be set like kaolinite when kneaded with water and dried or calcined.

An attempt to form sepiolite into a porous molded article has been made in Japanese Patent Publication No. 31085/80.

The above Publication discloses a sepiolite molded article for use in a heat insulator, an acoustic material, an adsorbent and a catalyst support. The specific surface area of the article is no less than 200 $m^2/g$. The pores of 74 angstroms or larger have a specific surface area of 100 $m^2/g$ or more and have a pore volume of 0.5–1.0 cc/g. The ratio of the pore volume of pores having a pore diameter of 200–600 angstroms to that of pores having a pore diameter of 74 angstroms or larger is not less than 60%.

The Publication No. 31085/80 discloses a process for production of a molded sepiolite which comprises the following steps:

(a) grinding sepiolite and adding water thereto to make a moisture-conditioning;

(b) sufficiently kneading the resulting sepiolite; and (c) molding the kneaded sepiolite and calcining the resultant.

The above Publication discloses an embodiment wherein the temperature of calcination is in the range of 300°–500° C. Example 3 in the publication states that aluminum nitrate was added to sepiolite to effect 3% of an aluminum metal ratio and the calcination was conducted at a temperature of 800° C. to thereby produce a sepiolite having some less pore volume, but a larger specific surface area and a highly improved crushing strength.

The resultant produced in the above manner and calcined at a temperature in the range of 300°–500° C. has a problem with respect to water-resistance in that it is deflocculated or peptized when it is immersed in water. When sepiolite per se is fired at a temperature of 800° C. or higher, the resultant is transformed into steatite, and the strength thereof is decreased, but the brittleness thereof is increased.

Japanese Patent Publication No. 18821/84 mentions that the pore volume and specific surface area were increased remarkably by an acid treatment of natural sepiolite.

The above Japanese Patent Publication discloses that the chemical reaction of natural sepiolite with a magnesium-eliminating agent to release a magnesium skelton from the sepiolite yields denatured sepiolite with a remarkably high porosity in comparison with natural sepiolite. The publication also mentions that such a sepiolite is useful as a catalyst for hydrogenation of heavy oil, especially for hydrodemetalization of heavy oil. The Publication, however, describes no information of pores having a pore diameter of 50 angstroms or less pores, which are particularly effective for adsorption. The publication does not suggest any porous sepiolite in which the pores having a pore diameter of 50 angstroms or less have a specific surface area in the range of 40 to 200 $m^2/g$ and in which no less than 20% of the total surface of the sepiolite is occupied by the pores having a pore diameter of 50 angstroms or less and wherein the pore distribution curve of the sepiolite has a main peak at a pore diameter of no more than 50 angstroms. The publication does not suggest any adsorptive decomposition catalysts which take advantage of such excellent adsorption activities, either.

SUMMARY OF THE INVENTION

Therefore, an object of the present invention is to provide a porous sepiolite which shows a high water-resistance and an excellent resistance to thermal shock caused by rapid heating and cooling.

Another object of the present invention is to provide a porous sepiolite in which pores of 50 angstroms or less have a large specific surface area which leads to excellent adsorption activities, and that shows excellent characteristics as a catalyst support.

Accordingly, the present invention provides a porous sepiolite in which the pores having a pore diameter of 50 angstroms or less have a specific surface area in the range of 40 to 200 $m^2/g$ and in which no less than 20% of the total surface of the sepiolite is occupied by the pores having a pore diameter of 50 angstroms or less and wherein the pore distribution curve of the sepiolite has a main peak at a pore diameter of no more than 50 angstroms.

This invention also provides an adsorptive decomposition catalyst composition which comprises a catalyst component supported on a porous sepiolite in which the pores having a pore diameter of 50 angstroms or less have a specific surface area in the range of 40 to 200 $m^2/g$ and in which no less than 20% of the total surface of the sepiolite is occupied by the pores having a pore diameter of 50 angstroms or less and wherein the pore distribution curve of the sepiolite has a main peak at a pore diameter of no more than 50 angstroms.

The present invention further provides a process for producing a water-resistant porous sepiolite, which comprises the steps of grinding, moisture-conditioning and molding sepiolite and then calcining the molded sepiolite at a temperature in the range of about 650° C. to about 800° C.

This invention also provides a process for producing a porous sepiolite in which the pores having a pore diameter of not more than 50 angstroms have a large surface area, which process comprises the steps of grinding, moisture-conditioning and molding sepiolite, calcining the sepiolite at a temperature in the range of about 650° C. to about 800° C., and then subjecting the calcined sepiolite to an acid treatment.

DETAILED DESCRIPTION OF THE INVENTION

Figure 1:
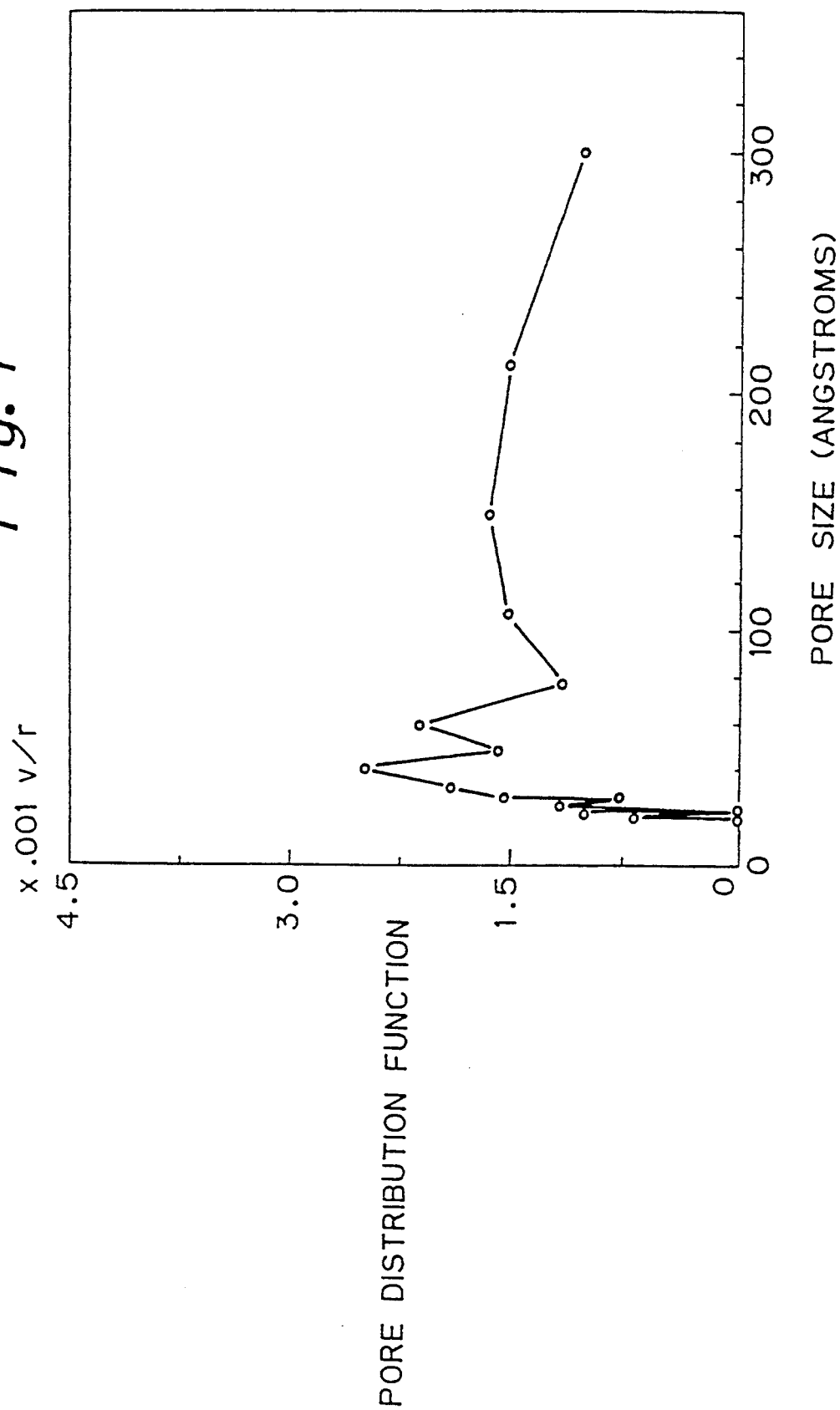
FIGS. 1 to 3 are graph representations showing the pore-size distributions of a porous sepiolite obtained in Examples.

According to an embodiment of the present invention, a water-resisting porous sepiolite is prepared through the steps of grinding, moisture-controlling and molding sepiolite, and calcining it at a temperature in the range of about 650° C. to about 800° C. This sepiolite has a water-resisting property and keeps pores having a pore diameter of 1000 angstroms or larger at a similar extent as natural sepiolite has. This sepiolite has a peptizing resistance to water that it will not peptize or swell by soaking it in water. The sepiolite also has a high fracture strength at freezing that the sepiolite having been soaked in water and frozen is not destroyed when it is rapidly cooled. The sepiolite of the present invention also has a high resistance to thermal shock such that the sepiolite having been heated to an elevated temperature of 600° C. will not become self-broken or damaged when it is put into cold water.

The specific surface area of natural sepiolite is usually less than 400 $m^2/g$. The surface area of sepiolite that has been calcined at a temperature of 300° C. is decreased to about 200 $m^2/g$. The area of sepiolite that has been calcined at a temperature in the range of 500° C. to 800° C. is decreased to the range of 200 to 120 $m^2/g$ as the temperature is raised. It is well known in the art that sepiolite, when calcined at an elevated temperature of 800° C. or higher, is transformed into steatite and that such a calcined sepiolite has a less surface area, a higher brittleness and a lower strength than non-calcined sepiolite. The firing at a temperature in the range of 300° C.–800° C. changes natural sepiolite into metasepiolite, and loses the crystalline structure of approximately 5–10 angstroms which is characteristic of sepiolite. Further, firing of the bundle of crystalline fibers (0.2 micrometers long, 100–300 angstroms wide, 50–100 angstroms thick) also decreases the surface area and crystallinity thereof. We have, however, found that the above-mentioned crystalline structure of 5–10 angstroms was not completely destroyed and that the pore openings and apertures in the structure were plugged and blocked due to dehydration, etc. We have also found that appropriate acid-treatment can recover the damaged crystalline structure and especially the zeolitic pores having a pore diameter of not more than 50 angstroms, which pores contribute largely to adsorption, and that the surface area is also increased. We have confirmed by an X ray diffraction method the fact that the crystalline structure was recovered near being a structure like the original natural sepiolite.

As a result of further studying on the basis of the information described above, we have found out that the process including the steps of grinding, moisture-conditioning and molding sepiolite, calcining the sepiolite at a temperature in the range of about 650° C. to about 800° C., and further subjecting the calcined sepiolite to an acid treatment can provide a porous sepiolite that has a specific surface area in the range of 40–200 $m^2/g$ with respect to the pores having a pore diameter of 50 angstroms or less, not less than 20% of the total surface area of the sepiolite being occupied with the pores having a pore diameter of 50 angstroms or less and the pore distribution curve of the sepiolite having a main peak at a pore diameter of no more than 50 angstroms. In view of its high adsorption and physical strength, a catalyst composition in which a catalyst component is supported on the porous sepiolite of the present invention can be used for adsorbing and removing foul odor or noxious components from the air in the storage compartment of a refrigerator.

Preferred processes for producing a water-resisting porous sepiolite according to the present invention will be described below.

Sepiolite is ground to a powder of less than 100 mesh size, preferably finer than 150 mesh, and water is added thereto to make moisture-conditioned sepiolite having a water content in the range of 40–200 wt. %, preferably 45–55 wt. %. The most important point is not to knead the resulting sepiolite to which water has been added when the sepiolite is stirred to make a moisture-controlled sepiolite having the water content as mentioned above. It is important, for the sake of obtaining the porous sepiolite of the present invention that has unique physical properties, to avoid kneading humidified powdered sepiolite. This is quite in contrast to the teaching disclosed in the above Japanese Patent Publication No. 31085/80 which emphasizes that enough kneading is important.

At the humidity-conditioning, water-soluble oxygen-containing compounds such as alcohols, esters, ethers, ketones, acetones and nitriles can be used together with water.

Humidity-controlled sepiolite powder was molded by pressure molding for instance into an appropriate shape and then the resultant was dried at a temperature in the range of 100° C.–150° C. The dried sepiolite mold was then calcined at a temperature in the range of 650° C.–800° C., preferably at a temperature in the range of 700° C.–800° C., more preferably at a temperature in the range of 720° C.–770° C., to produce a porous sepiolite mold which had a crystalline structure similar to that of metasepiolite.

The porous sepiolite mold obtained had the following properties:

| | | |
|---|---|---|
| specific surface area (BET method) | 120–180 $m^2/g$ | |
| pore volume (mercury penetration method, up to 30,000 PSIG) | 0.6–1.0 cc/g | |
| | pore diameter | pore volume |
| pore volume distribution: (mercury penetration method, up tp 30,000 PSIG) | <200 angstroms | <0.30 cc/g |
| | 200–600 angstroms | <0.35 cc/g |
| | 600–1000 angstroms | <0.10 cc/g |
| | >1000 angstroms | >0.15 cc/g |
| bending strength at 45 mm-interval (of a sepiolite which was molded to a 54 mm × 18 mm × 6 mm plate under the pressure of 50 kg/$cm^2$) | 0.8–2.0 kg | |

MEASUREMENT OF BENDING STRENGTH

Figure 5:
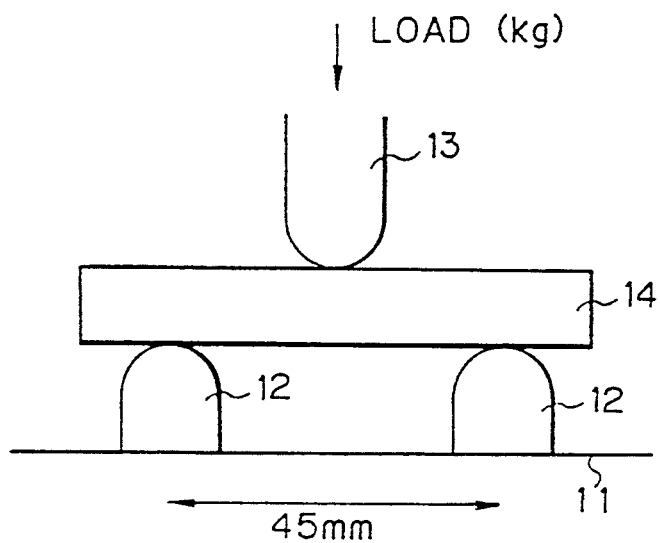
FIG. 5 shows an apparatus for measuring a bending strength.

The bending strength was determined with the apparatus shown in FIG. 5. Specifically, support members 12 each having a tip of 5 mm-radius of curvature were set on a base plate 11 at 45 mm interval. A specimen 14 was put onto the tips of the support members 12 and was loaded through a presser plate 13 which had the same radius of curvature as that of the support members 12. The bending strength was identified as the value of the load (kg) when the specimen was broken.

MEASUREMENT OF PEPTIZATION

A peptization test was performed by soaking the porous sepiolite in water. The water-resisting sepiolite of the present invention did not swell nor peptize.

MEASUREMENT OF FRACTURE TENDENCY AT FREEZING

The sample was heated to a temperature of 600° C. and then cooled rapidly to get frozen. The water-resisting sepiolite of the present invention did not become embrittled or broken.

THERMAL SHOCK TEST

A test cycle of heating the sample at 350° C. for thirty minutes and allowing it to stand at ambient temperature and then adding a predetermined amount of water to the sample was repeated 3000 times to determine a resistance to thermal shock. After the 3000-cycle test, the bending strength of the sample was over ⅔ of the initial value of the bending strength.

The porous sepiolite obtained from the calcination step is soaked into an aqueous solution of an acid, is washed with water and then is dried to produce a porous sepiolite in which pores having a pore diameter of 50 angstroms or less have a specific surface area of from 40 to 200 m$^2$/g, no less than 20% of the total surface of the sepiolite is occupied by the pores having a pore diameter of 50 angstroms or less and the pore distribution curve of which has a main peak at a pore diameter of no more than 50 angstroms. The maximum pores having a pore diameter of 1000 angstroms or larger in this sepiolite are almost like those of natural sepiolite. This characteristic appears in none of the conventional products that have been prepared by sufficiently kneading the moisture-controlled sepiolite powder and then molding the resultant. When the porous sepiolite of the present invention is used as a support for oxidative deodorizing catalyst compositions, this sepiolite can enhance catalyst activities since the maximum pores enable odorous molecules to easily diffuse therethrough.

As the soaking solution, an aqueous solution of 0.1–10 wt. %, preferably 0.5–2 wt. % of an inorganic acid such as nitric acid, sulfuric acid, hydrochloric acid and the like can be used.

Soaking time usually ranges from 30 minutes to 5 hours.

A catalyst component may be supported on the porous sepiolite of the present invention to make an adsorptive decomposition catalyst composition according to the present invention.

Catalyst components that are able to oxidize foul odor or noxious components in gases for example at heating can be used in the present invention. The catalyst components include a metal, an oxide or a complex compound of at least one elementary metal selected from the group consisting of platinum group metals, manganese, iron, cobalt, nickel, silver and rare earth metals such as cerium and lanthanum. Among said metals, the platinum group metals are preferable, especially platinum or platinum-palladium is preferred. The addition of a rare earth metal in the form of oxide especially cerium or lanthanum in the catalyst components improves the heat-resistance of the catalyst.

Catalyst components can be supported by conventional methods.

The supporting amount of a platinum group metal is in the range of 0.5–5 g/l, preferably 1–2 g/l, and that of a rare earth metal is in the range of 1–100 g/l, preferably 5–20 g/l.

The catalyst composition of the present invention obtained in the manner described above can be used for removal of foul smells in a refrigerator by adsorptive decomposition thereof.

Porous sepiolites in accordance with the present invention have an excellent resistance to thermal-shock and to freeze-destruction and an improved peptization resistance to water. The catalyst composition utilizing the porous sepiolite of the present invention is suitable for use under severe conditions in which a drastic change in temperature may occur and in which water may splash thereto.

The following examples illustrate the present invention.

EXAMPLE 1

A 10 kg Turkish sepiolite of a high purity (purity 92% or higher) containing 17 wt. % of water was ground to 200 mesh powder with a grinder and was mixed well with a mortar mixer.

The powdered sepiolite was added with 6 kg of water and mixed well by hands, without kneading, to yield a homogeneously moisture-controlled material. The moisture-controlled sepiolite was subjected to a 100-mesh screen to produce powder which consisted of 100 mesh and finer particles. The sepiolite was molded under pressure into a sepiolite plate.

The resulting sepiolite plate was dried at a temperature of 120° C. for 12 hours, followed by calcination at a temperature of 750° C. for 3 hours to yield a Porous Sepiolite A of 54 mm × 18 mm × 6 mm.

The Porous Sepiolite A had the following properties:

| | |
|---|---|
| specific surface area (BET method) | 155 m$^2$/g |
| pore volume (mercury penetration method, up to 30,000 PSIG) | 0.83 cc/g |
| pore volume distribution obtained by a mercury penetration method under a pressure up to 30,000 PSIG: | |
| 200 angstroms in pore diameter or smaller | 0.25 cc/g or less |
| 200–600 angstroms in pore diameter | 0.35 cc/g or less |
| 600–1000 angstroms in pore diameter | 0.08 cc/g or less |
| 1000 angstroms or larger in pore diameter | 0.15 cc/g or more |
| The bending strength at 45 mm-interval: | 1.3 kg |

COMPARATIVE EXAMPLE 1

The same procedure as Example 1 was repeated, except that the calcining temperature was 350° C., to obtain a Porous Sepiolite B.

COMPARATIVE EXAMPLE 2

The same procedure as Example 1 was repeated, except that the calcining temperature was 500° C., to produce a Porous Sepiolite C.

COMPARATIVE EXAMPLE 3

The same procedure as Example 1 was repeated, except the the calcining temperature was 850° C., to produce a Porous Sepiolite D.

COMPARATIVE EXAMPLE 4

The same procedure as Example 1 was repeated, except that the moisture-controlled sample was kneaded well, to produce a Porous Sepiolite E. The Porous Sepiolite E had a pore volume of 0.05 cc/g or less with respect to the maximum pores having a pore diameter of 1000 angstroms or larger. This value means that a substantial amount of the maximum pores were destroyed.

COMPARATIVE EXAMPLE 5

Alumina gibbsite obtained by precipitation was water-controlled to have a water content of about 48% and was then pressure-molded and dried in the same way as described in Example 1. The resultant was calcined at a temperature of 600° C. for 2 hours to yield a 54 mm × 18 mm × 6 mm alumina plate.

The Porous Sepiolites A, B, C and D were soaked into water to perform the peptization test explained previously. Sepiolite Plates B and C swelled and were peptized. This fact shows the fact that products calcined at a low temperature do not perform a water-resistance.

The Sepiolite Plates B and C turned blackish because the low calcining temperature caused the carbonization of organic compounds such as humic acid, tannic acid, polyhydric alcohols and their esters contained in the natural sepiolite.

The Porous Sepiolite D that was calcined at an elevated temperature over 800° C. was transformed into steatite with the pores disappeared, the porosity was reduced and the strength was decreased due to brittlement.

The Porous Sepiolite A and the above-mentioned alumina plate were subjected to the measurement of fracture tendency at freezing in the way as described previously. The Porous Sepiolite A showed no change, but the alumina plate was cracked and destroyed.

Sepiolite A was subjected to the thermal shock test as mentioned above. The following results on the bending strength were obtained:

| | |
|---|---|
| Initial Strength | 1.2 kg |
| the value after 3000 cycles (0.5 cc of water was added) | 1.2 kg |
| the value after 3000 cycles (1.0 cc of water was added) | 0.8 kg |

EXAMPLE 2

Porous Sepiolite A obtained in Example 1 was immersed in an aqueous solution of 1% nitric acid at a temperature of 50° C. for 1 hour and was then washed with water to yield a Porous Sepiolite F.

EXAMPLE 3

The same procedure as Example 2 was repeated, except that the soaking time was 2 hours, to produce a Porous Sepiolite G.

The properties of the Porous Sepiolites A, F and G are summarized in the following Table.

| | BET method surface area X ($m^2/g$) | Mercury Penetration (up to 35,000 PSIG) | | X − Y | $\frac{X-Y}{X} \times 100\%$ |
|---|---|---|---|---|---|
| | | surface area Y (>50Å in pore diameter) ($m^2/g$) | pore volume (>50Å in pore diameter) (cc/g) | | |
| Porous Sepiolite A | 156 | 154 | 0.820 | 2 | 1.3 |
| Porous Sepiolite F | 198 | 158 | 0.813 | 40 | 20.2 |
| Porous Sepiolite G | 223 | 160 | 0.803 | 63 | 28.3 |

| The bending strength at 45 mm-interval (of a sepiolite which was molded to a 54 mm × 18 mm × 6 mm plate under the pressure of 50 kg/cm²) | | |
|---|---|---|
| Sepiolite A | Sepiolite F | Sepiolite G |
| 1.3 kg | 1.5 kg | 1.5 kg |

The bending strengths were determined with the apparatus illustrated in FIG. 5.

Figure 2:
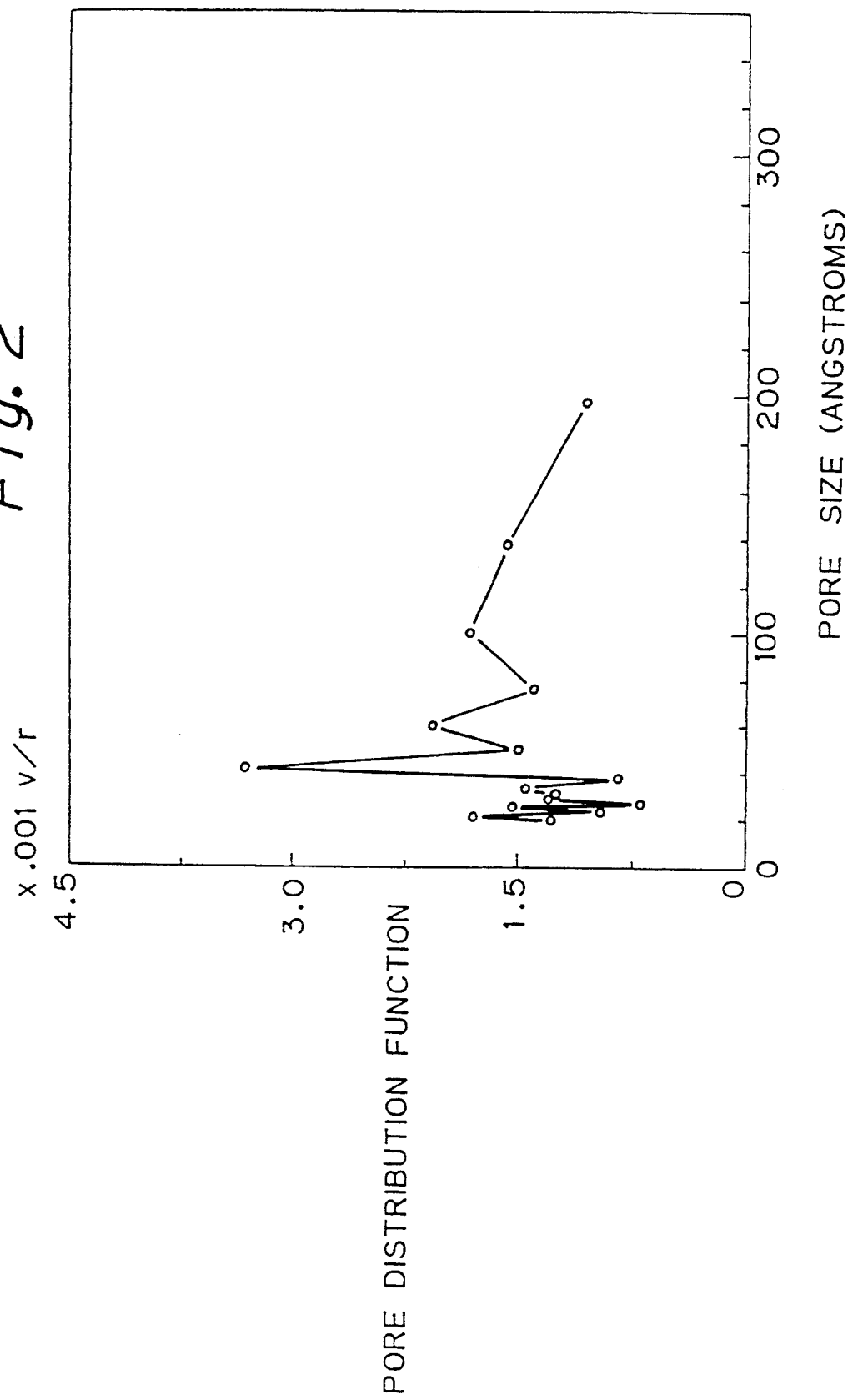
Figure 3:
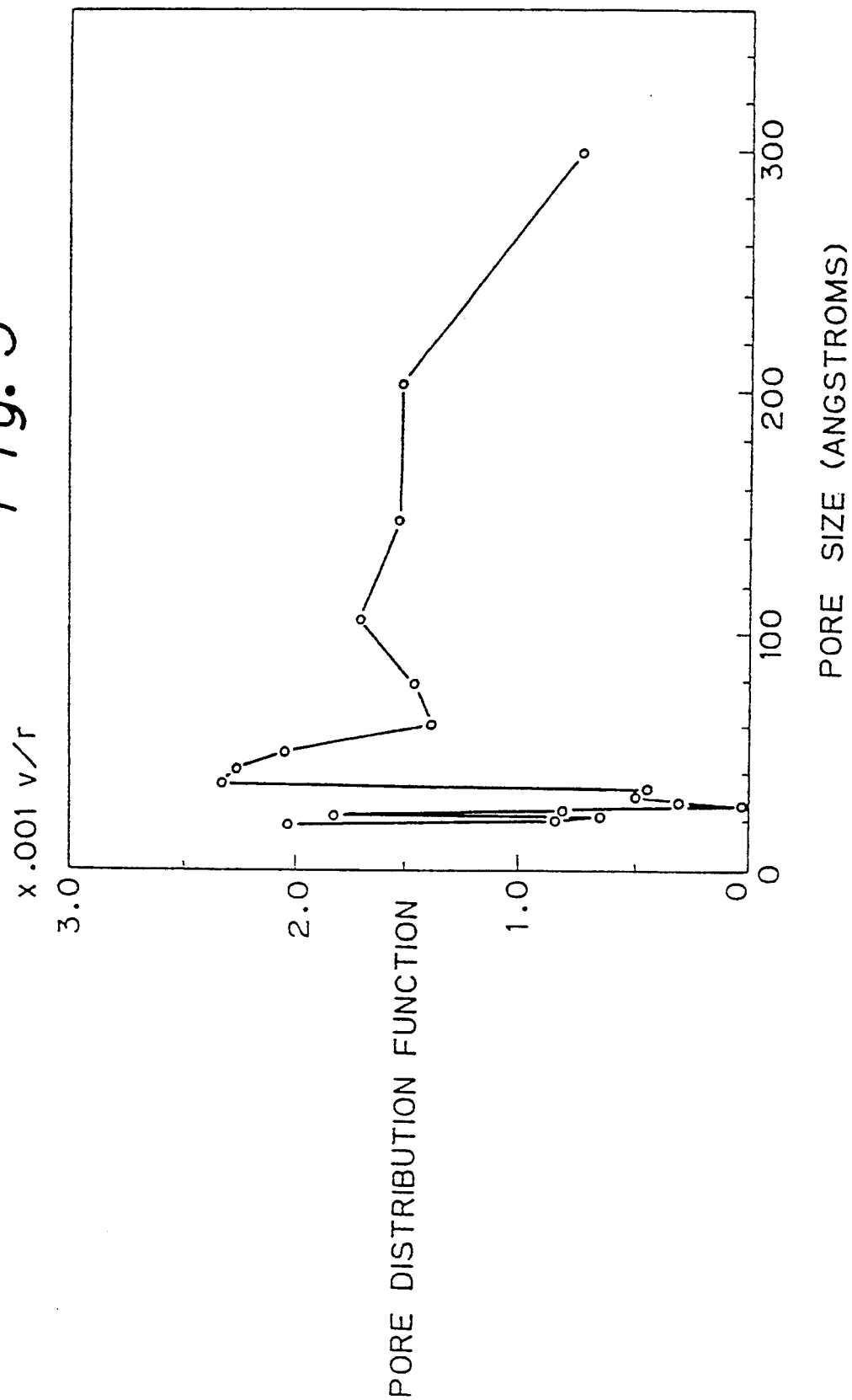

The pore size distributions of the Sepiolites A, F, and G are shown in FIGS. 1, 2 and 3, respectively.

The figures indicate that each pore-size distribution curve of the Sepiolites F and G, which were treated with nitric acid, has a main peak at a pore diameter of 50 angstroms or smaller. This confirms that the acid treatment caused the appearance of pores of 50 angstroms or less.

COMPARATIVE EXAMPLE 6

The procedure to prepare a Porous Sepiolite H was the same as that of Example 2 except that the calcining temperature was 500° C. The Porous Sepiolite H obtained was treated with nitric acid in the same way as described in Example 2. After the acid treatment, the Porous Sepiolite H was peptized into crumbs. This means that said Porous Sepiolite H did not have a practical strength and it was not suitable for practical use.

EXAMPLE 4

Porous Sepiolite A obtained in Example 1, Porous Sepiolite F obtained in Example 2, and Porous Sepiolite G obtained In Example 3, each 9 sheets, were dipped in an aqueous solution prepared by adding 0.74 grams of ammonia water (made by Wako Pure Chemical Industries, Ltd.) to 5.13 milliliters of hexamineplatinum (IV) dichloride (Pt content: 1.463%) to adjust the mixture to have a pH of 10.5 and then diluting the resultant to 1440 milliliters. After washing with water and drying, the resultant sepiolites were then reduced in a stream of hydrogen at a temperature of 500° C. to make Adsorptive Decomposition Catalyst Compositions A, F and G, respectively. Each of the Adsorptive Decomposition Catalysts Compositions had platinum in an amount of 1.47 g/l as calculated as Pt.

EXAMPLE 5

Trimethylamine Reaction Test

Figure 4:
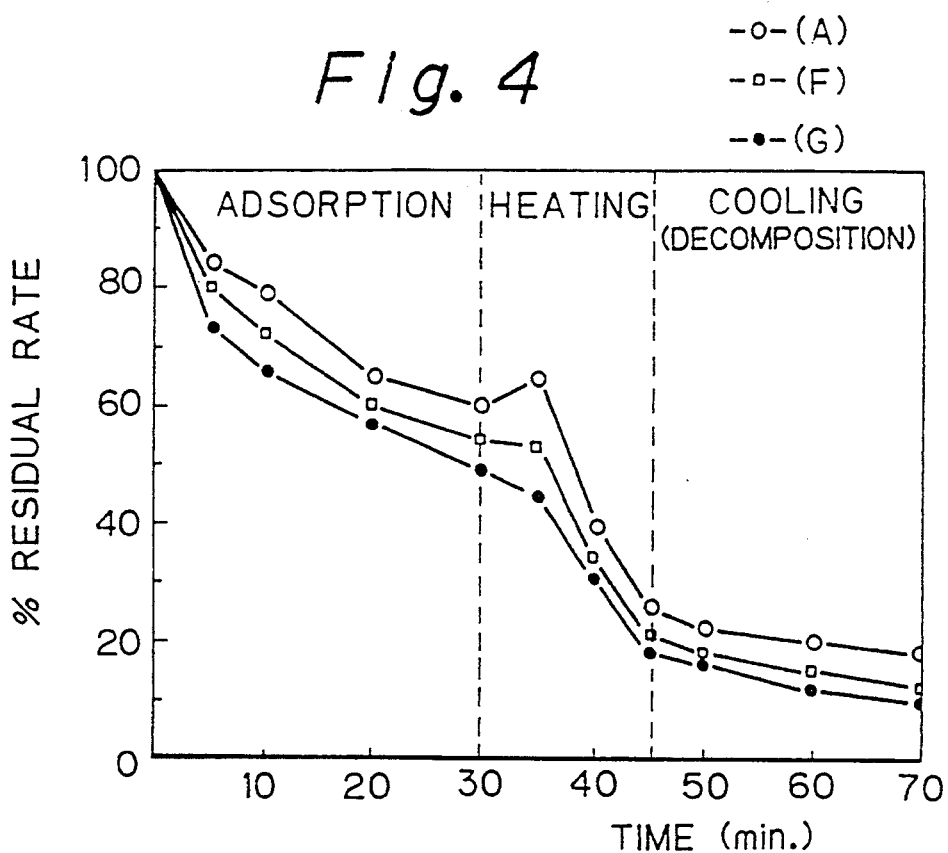
FIG. 4 is a graph representation showing the residual rate of trimethylamine after treatment with an adsorptive decomposition catalyst composition of the present invention.

The Adsorptive Decomposition Catalyst Compositions A, F and G thus obtained were each placed in a 16-liter glass vessel, and trimethylamine was charged thereinto so as to make a concentration in the vessel of 3000 ppm. After allowing it to stand at room temperature for 30 minutes, the surface temperature of each of the Adsorptive Decomposition Catalyst Compositions was elevated up to a temperature of 350° C. for 15 minutes, and after allowing it to cool for 25 minutes, the changes of trimethylamine concentration were determined. The results are shown in FIG. 4.

The residual rate (%) was obtained from the following equation:

Residual Rate $(\%) = C_t/C_o \times 100$ wherein Co means an initial concentration and Ct means a concentration at a time of t.

It is evident from FIG. 3 that the Adsorptive Decomposition Catalyst Compositions F and G that were prepared by the use of acid-treated sepiolites F and G, respectively, have both high adsorption and excellent oxidative decomposition capability.

EXAMPLE 6

The Adsorptive Decomposition Catalysts Compositions F and G obtained in Example 4 were placed near the defrosting heater in a circulation passage for a cool air, since the air in the refrigerator was circulated through the circulation passage by means of a fan during the cooling operation of the refrigerator. At that time odor components generated from stored foods were adsorbed and removed by said Adsorptive Decomposition Catalyst Compositions F and G, whereby the deodorization in the refrigerator was achieved. Furthermore, when the frosted freezing condenser decreased a cooling capacity, the defrosting heater was started automatically. At that time, the heat from the defrosting heater was utilized to heat the Adsorptive Decomposition Catalyst Compositions F and G and to cause desorption of the odor gases adsorbed onto said Adsorptive Decomposition Catalyst Compositions to thereby regenerate the same for recovery of adsorptive capacities thereof. The odor gases desorbed therefrom were catalytically oxidized and decomposed in situ by the oxidative catalyst supported thereon. During the operation, said Adsorptive Decomposition Catalyst Compositions F and G were frozen and heated repeatedly under such conditions that a large amount of moisture was attached or absorbed thereonto. The Adsorptive Decomposition Catalyst Compositions F and G of the present invention were not destroyed at freezing, and they performed an excellent thermal shock resistance without self-breaking, and showed satisfactory capabilities for the treatment of odor gases by adsorptive decomposition.

What is claimed is:

1. An adsorptive decomposition catalyst composition comprising a catalyst component supported on a water resisting, hard, porous metasepiolite in which pores having a pore diameter of 50 angstroms or less have a specific surface area of from 40–200 $m^2/g$ and in which no less than 20% of the total surface of said metasepiolite is occupied with the pores having a pore diameter of 50 angstroms or less and in which the pore distribution curve of said metasepiolite has a main peak at a pore diameter of no more than 50 angstroms.

2. The adsorptive decomposition catalyst composition according to claim 1 wherein said catalyst component is a metal, an oxide or a complex compound of at least one metal element selected from the group consisting of platinum group metals, manganese, iron, copper, cobalt, nickel, silver and rare earth metals.

* * * * *